US009630101B2

(12) United States Patent
Togawa

(10) Patent No.: US 9,630,101 B2
(45) Date of Patent: Apr. 25, 2017

(54) OPERATING DEVICE

(71) Applicant: Sony Computer Entertainment Inc., Tokyo (JP)

(72) Inventor: Keiji Togawa, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 268 days.

(21) Appl. No.: 14/382,581

(22) PCT Filed: Feb. 25, 2013

(86) PCT No.: PCT/JP2013/054824
§ 371 (c)(1),
(2) Date: Sep. 3, 2014

(87) PCT Pub. No.: WO2013/136960
PCT Pub. Date: Sep. 19, 2013

(65) Prior Publication Data
US 2015/0031457 A1 Jan. 29, 2015

(30) Foreign Application Priority Data

Mar. 13, 2012 (JP) ................................. 2012-056523
Mar. 13, 2012 (JP) ................................. 2012-056524

(51) Int. Cl.
*G06F 17/00* (2006.01)
*A63F 13/24* (2014.01)
(Continued)

(52) U.S. Cl.
CPC ............ *A63F 13/24* (2014.09); *G06F 3/0338* (2013.01); *H01H 25/002* (2013.01);
(Continued)

(58) Field of Classification Search
USPC ...................................................... 463/36–42
See application file for complete search history.

(56) References Cited

U.S. PATENT DOCUMENTS 6,231,444 B1 * 5/2001 Goto ..................... G05G 9/047
273/148 B
6,394,906 B1 * 5/2002 Ogata ................... G06F 3/0216
273/148 B
(Continued)

FOREIGN PATENT DOCUMENTS

JP 9-190742 A 7/1997
JP 2008-132904 A 6/2008
JP 2011-60724 A 3/2011

OTHER PUBLICATIONS

International Preliminary Report on Patentability and Written Opinion for corresponding application PCT/JP2013/054824, dated Sep. 25, 2014.
(Continued)

*Primary Examiner* — Ronald Laneau
(74) *Attorney, Agent, or Firm* — Matthew B. Dernier, Esq.

(57) ABSTRACT

An operating device includes an operating shaft, a movable body that supports the operating shaft, and a base body. The base body includes a contact surface that is in contact with the movable body so as to receive, from the movable body, forces along the plane vertical to the axial direction of the operating shaft. Further, the operating device includes a plurality of sensors adapted to detect forces acting on the base body. The operating device allows the motion of the operating shaft on the plane vertical to the axial direction of the operating shaft and the detection of the motion.

18 Claims, 10 Drawing Sheets

(51) Int. Cl.
 *G06F 3/0338* (2013.01)
 *H01H 25/04* (2006.01)
 *H01H 25/06* (2006.01)
 *H01H 25/00* (2006.01)

(52) U.S. Cl.
 CPC ........ *H01H 25/006* (2013.01); *H01H 25/008* (2013.01); *H01H 25/04* (2013.01); *H01H 25/06* (2013.01); *A63F 2300/1006* (2013.01); *A63F 2300/1043* (2013.01); *H01H 2025/004* (2013.01); *H01H 2025/043* (2013.01)

(56) References Cited

U.S. PATENT DOCUMENTS

| | | | | |
|---|---|---|---|---|
| 6,682,426 | B2* | 1/2004 | Goto | G05G 9/047 |
| | | | | 463/37 |
| 7,296,810 | B2* | 11/2007 | Thannikary | B62D 15/023 |
| | | | | 280/93.5 |
| 7,543,831 | B2* | 6/2009 | Pope | B62D 15/023 |
| | | | | 280/93.5 |
| 8,641,529 | B2* | 2/2014 | Bronstein | A63F 13/10 |
| | | | | 463/25 |
| 2009/0294259 | A1 | 12/2009 | Kuno et al. | |

OTHER PUBLICATIONS

International Search Report for corresponding application PCT/JP2013/054824, dated May 7, 2013.

\* cited by examiner

OPERATING DEVICE

TECHNICAL FIELD

The present invention relates to an operating device having an operating shaft.

BACKGROUND ART

An operating device having an operating shaft operated by a user has been used as an input device for electronic devices such as game console. In the U.S. Pat. No. 6,394,906 specification, the base section of the operating shaft is supported by a rotatable support shaft in such a manner as to tilt the operating shaft. The tilting direction and the magnitude of tilt of the operating shaft are calculated from the rotational angle of the support shaft.

SUMMARY

However, the above conventional structure adapted to detect the motion of the operating shaft from the rotational angle of the support shaft has difficulty increasing the number of ways in which the operating shaft can be operated. For example, it is difficult to achieve motions of the operating shaft on a plane vertical to the axial direction such as translation in the radial direction and rotation of the operating shaft about its center.

An operating device according to an embodiment of the present invention includes an operating shaft, a movable body, and a base body. The movable body holds the operating shaft. The base body includes a portion that is in contact with the movable body. This portion supports the movable body to allow the operating shaft to move on a plane vertical to the axial direction of the operating shaft and receives, from the movable body, forces along the plane vertical to the axial direction. Further, the operating device includes a plurality of sensors adapted to detect forces acting on the base body. The operating device according to the present embodiment allows detection of the motion of the operating shaft on the plane vertical to the axial direction of the operating shaft.

An operating device according to another embodiment of the present invention includes an operating shaft, a movable body, an elastic body, a contact section, and a sensor. The movable body holds the operating shaft and can relatively move in a first direction relative to the operating shaft. The elastic body can elastically deform in the first direction and is elastically deformed by the movable body moving in the first direction. The contact section is in contact with the movable body to allow the movable body to move in the first direction in response to the motion of the operating shaft in a second direction. The sensor detects a force appropriate to the elastic force of the elastic body. The operating device according to the present embodiment can detect the amount of travel of the operating shaft from the sensor output by detecting, with the sensor, the force caused by the elastic deformation of the elastic body resulting from the motion of the operating shaft. Further, it is no longer necessary to arrange the elastic body in such a manner as to elastically deform in the second direction for detection of the motion of the operating shaft in the second direction, thus providing a higher degree of freedom in laying out the elastic body.

BRIEF DESCRIPTION OF DRAWINGS

FIG. 9(a) is a cross-sectional view, FIG. 9(b) is a cross-sectional view along line b-b in (a), and FIG. 9(c) is an enlarged view of (b).

DESCRIPTION OF EMBODIMENT

Figure 1:
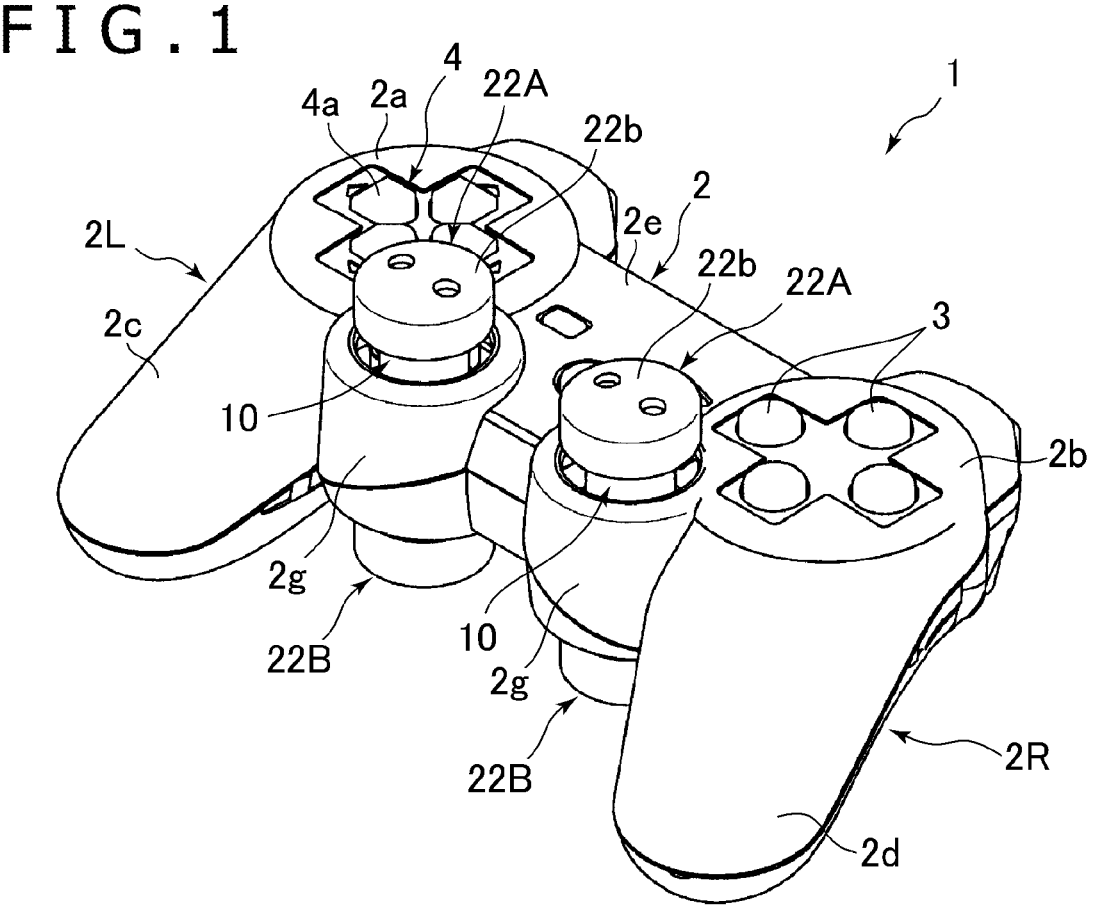
FIG. 1 is a perspective view of an operating device according to an embodiment of the present invention.

A description will be given below of an embodiment of the present invention with reference to the accompanying drawings. FIG. 1 is a perspective view of an operating device 1 according to the embodiment of the present invention.

As illustrated in FIG. 1, a housing 2 of the operating device 1 has held sections 2R and 2L on the right and left portions thereof, respectively. The held sections 2R and 2L are held with user's hands. A plurality of buttons (four buttons in this example) 3 are provided on the upper face of a front portion 2b of the held section 2R on the right. The held section 2R has a grip 2d that extends backward from the front portion 2b and that is gripped by the user. A directional key 4 is provided on a front portion 2a of the held section 2L on the left. The directional key 4 has four projections 4a that are arranged in a cross pattern. The held section 2L also has a grip 2c that extends backward from the front portion 2a and that is gripped by the user. The front portion 2b of the held section 2R and the front portion 2a of the held section 2L are connected by a connecting section 2e. An operating shaft assembly 10 is arranged between the connecting section 2e and the left grip 2c. Further, an operating shaft assembly 10 is also arranged between the connecting section 2e and the right grip 2d. Each of the operating shaft assemblies 10 is accommodated in a tubular assembly accommodating section 2g that is formed between the connecting section 2e and the grip 2c or 2d. The operating device 1 need not always include the two operating shaft assemblies 10. That is, the operating shaft assembly 10 either between the connecting section 2e and the grip 2c or between the connecting section 2e and the grip 2d need not be provided.

Figure 2:
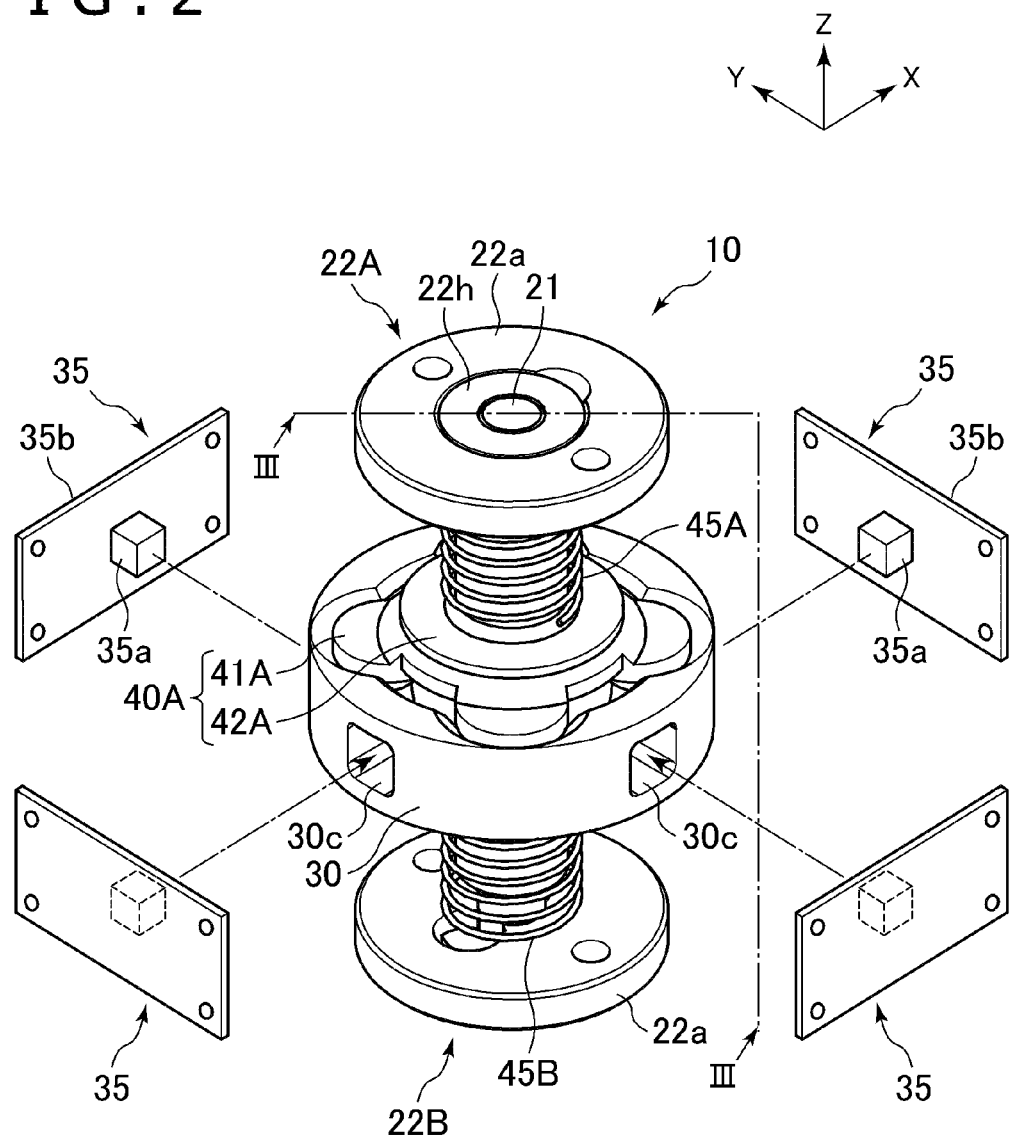
FIG. 2 is a perspective view of an operating shaft assembly included in the operating device.
Figure 3:
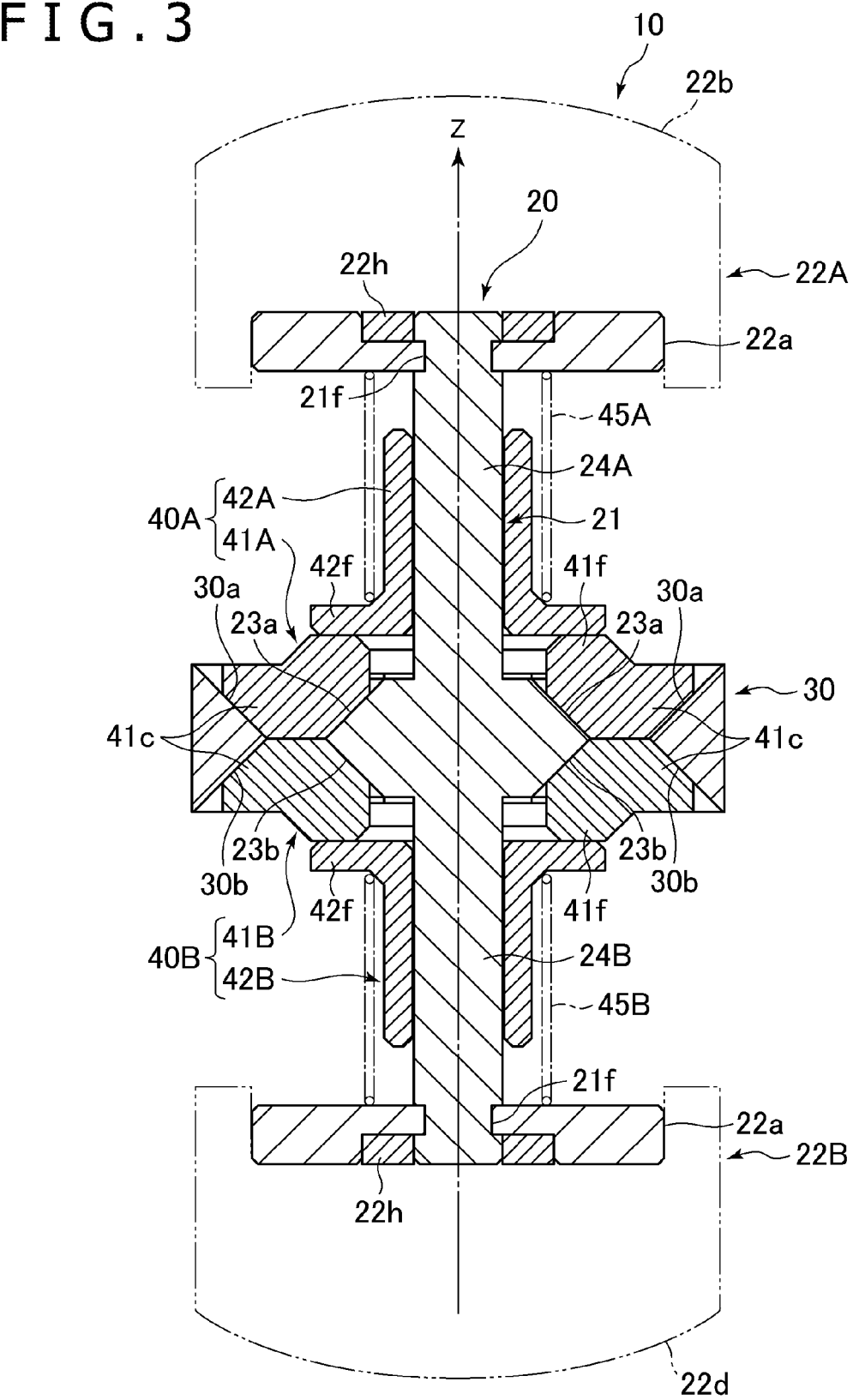
FIG. 3 is a cross-sectional view of the operating shaft assembly in which the cross-section is taken along the plane indicated by line III-III in FIG. 2.
Figure 4:
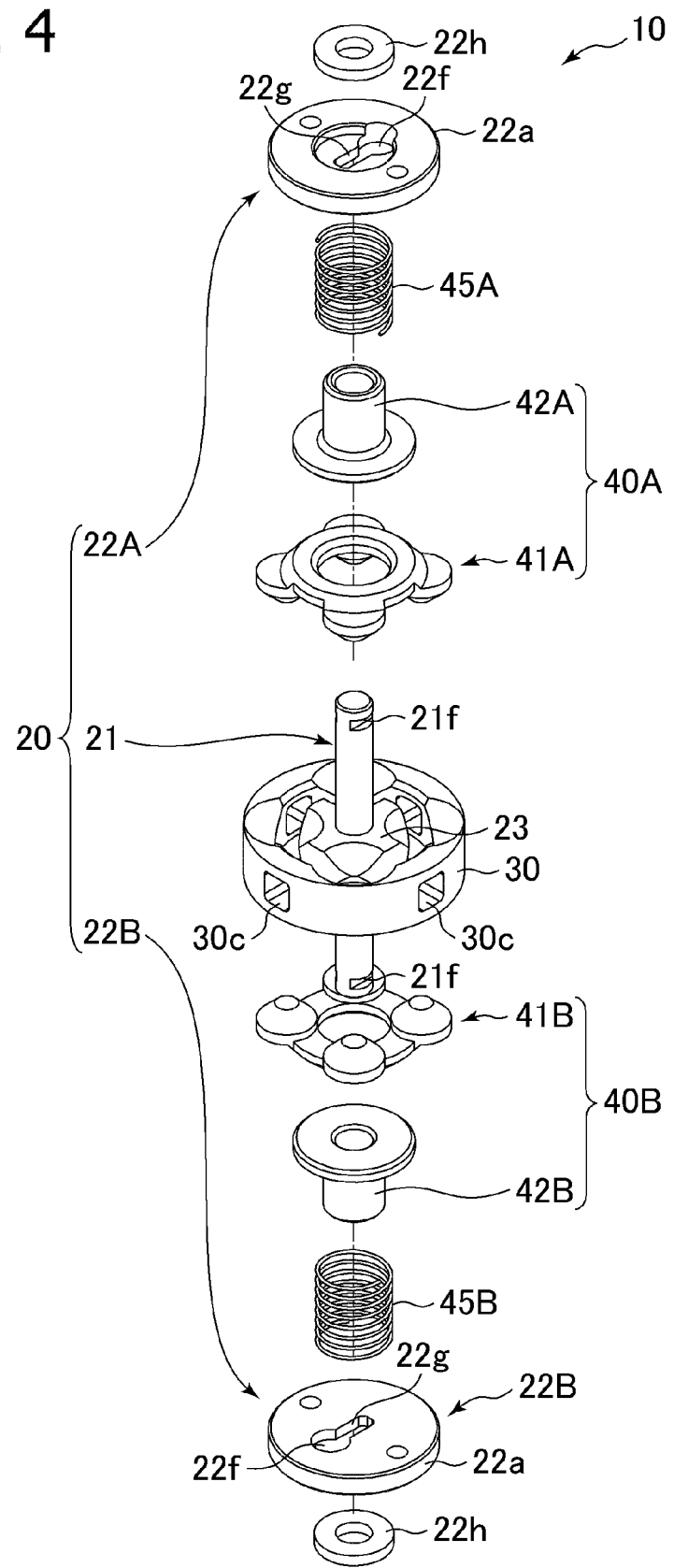
FIG. 4 is an exploded perspective view of the operating shaft assembly.
Figure 5:
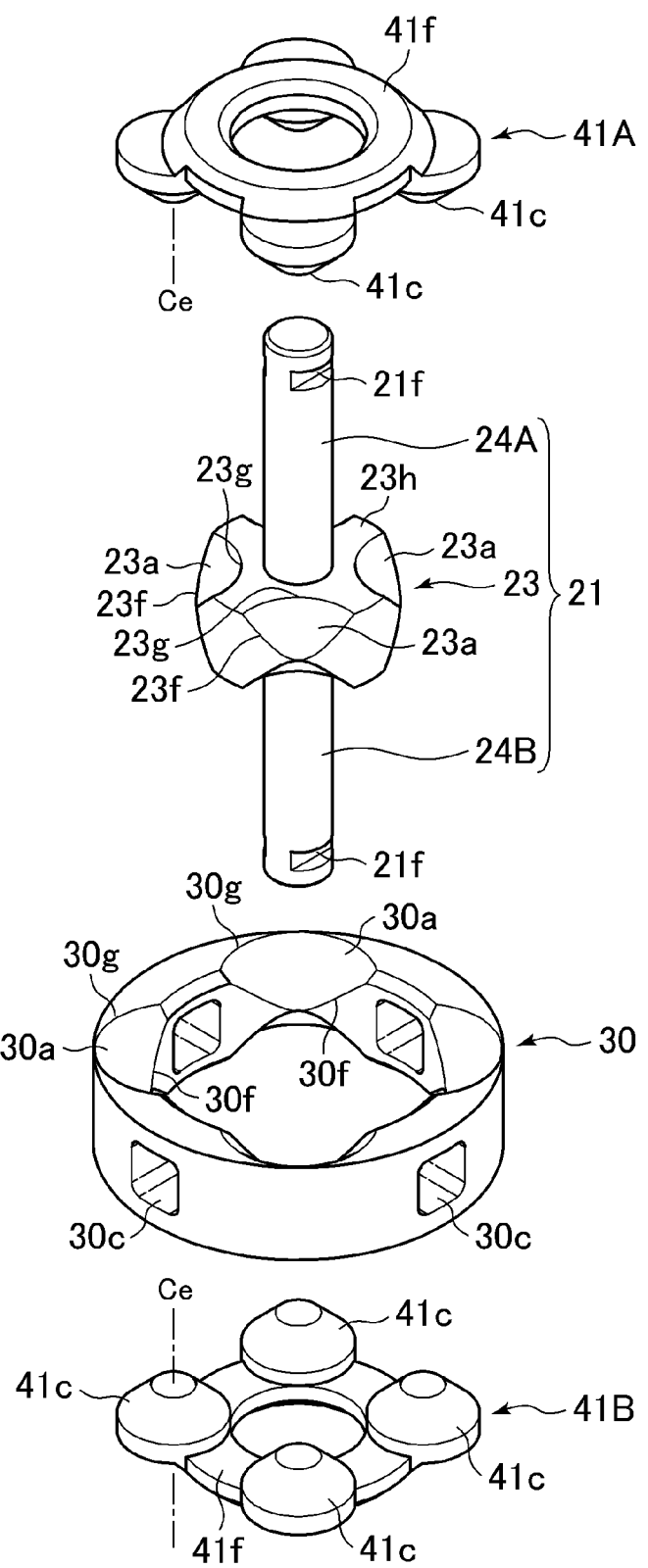
FIG. 5 is an exploded perspective view of an operating shaft and a base body making up the operating shaft assembly.
Figure 6:
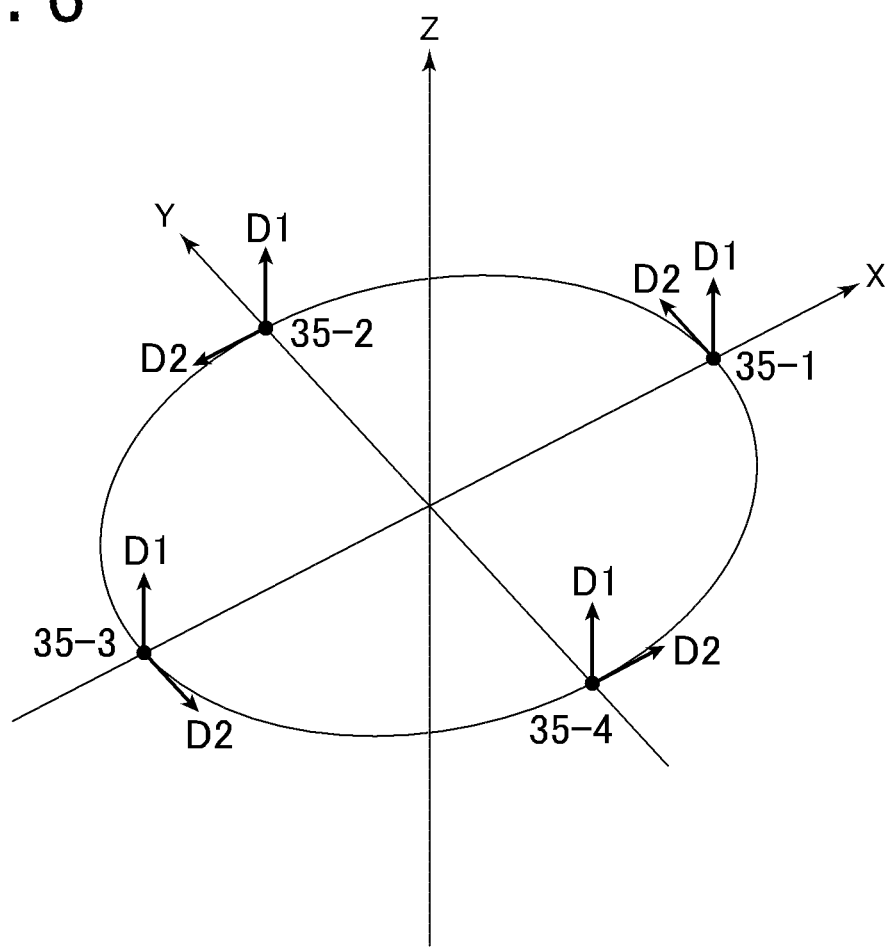
FIG. 6 is a diagram for describing directions in which sensors making up the operating shaft assembly detect forces.

FIG. 2 is a perspective view of the operating shaft assembly 10 included in the operating device 1. FIG. 3 is a cross-sectional view of the operating shaft assembly 10 in which the cross-section is taken along the plane indicated by line III-III in FIG. 2. FIG. 4 is an exploded perspective view of the operating shaft assembly 10. FIG. 5 is an exploded perspective view of an operating shaft 20, a base body 30, and movable bodies 40A and 40B. FIG. 6 is a diagram for describing directions in which sensors 35 making up the operating shaft assembly 10 detect forces. As will be described in detail later, the assembly 10 has a plurality of sensors (four sensors in this example) 35. In FIG. 6, reference numerals 35-1 to 35-4 represent the respective sensors 35. In the description given below, reference numerals 35-1 to 35-4 are used only when the specific sensor or sensors of the four sensors 35 are indicated. The Z axis is a reference axis that runs along the center of the operating shaft 20 at its initial position (operating shaft 20 at the position shown in FIG. 3). The X and Y axes are reference axes each orthogonal to the Z axis and orthogonal to each other. That is, both the X and Y axes are reference axes that run in the radial direction of the operating shaft 20 at its initial position. As illustrated in FIG. 6, the two sensors 35-1 and 35-3 that are located on the opposite sides of each other are arranged on the X axis. The two sensors 35-2 and 35-4 that are located on the opposite sides of each other are arranged on the Y axis.

As illustrated in FIG. 3, the assembly 10 has the operating shaft 20. The operating shaft 20 in this example has a shaft main body 21, a first operating section 22A, and a second operating section 22B. The first operating section 22A is provided at the upper end of the shaft main body 21. The second operating section 22B is provided at the lower end of the shaft main body 21. The user can operate the operating shaft 20 by pinching the first and second operating sections 22A and 22B with two fingers, one (e.g., thumb) arranged on the front side of the operating device 1 and another (e.g., index or middle finger) arranged on the back side thereof. For example, the user can translate the operating shaft 20 in the radial direction or tilt the operating shaft 20 with the operating sections 22A and 22B pinched.

As illustrated in FIG. 3, the first operating section 22A has a flange 22a that is attached to the upper end of the shaft main body 21. The flange 22a has a shape that spreads radially from the shaft main body 21 (circular shape in this example). Further, the first operating section 22A has a pad 22b that is attached to the upper area of the flange 22a (refer to FIG. 1). As with the first operating section 22A, the second operating section 22B also has a flange 22a that is attached to the lower end of the shaft main body 21. Further, the second operating section 22B has a pad 22d that is attached to the lower area of the flange 22a.

As illustrated in FIG. 4, a groove 21f is formed in the outer perimeter surface of the end portion of the shaft main body 21. A hole 22f and a thin hole 22g are formed in each of the flanges 22a. The hole 22f is located off the center of the shaft main body 21. The thin hole 22g extends from the hole 22f toward the center of the shaft main body 21. The size of the hole 22f matches the diameter of the shaft main body 21. The width of the thin hole 22g matches the thickness of the portion of the shaft main body 21 where the groove 21f is formed. The flange 22a is fastened to the shaft main body 21 as the portion of the shaft main body 21 where the groove 21f is formed is fitted into the thin hole 22g. That is, in the manufacturing process of the assembly 10, the shaft main body 21 is fitted into the hole 22f. Then, the portion where the groove 21f is formed is moved along the thin hole 22g in such a manner as to fit into the thin hole 22g. A ring 22h is attached to the flange 22a to prevent the shaft main body 21 from returning into the hole 22f. It should be noted that the manner in which to fasten the flange 22a to the shaft main body 21 is not limited thereto. The flange 22a may be fastened with a screw.

As illustrated in FIG. 4, the assembly 10 has the base body 30 that surrounds the operating shaft 20 (large diameter portion 23 to be described later, in this example). The base body 30 in this example is approximately annular in shape. The operating sections 22A and 22B are located on the opposite sides of each other with the base body 30 sandwiched therebetween.

As illustrated in FIG. 2, the assembly 10 has the plurality of sensors 35 attached to the base body 30. The sensors 35 are arranged along the circumferential direction of the operating shaft 20 with spacings therebetween. In this example, the four sensors 35 are arranged equidistantly (at intervals of 90 degrees). The sensors 35 engage with the base body 30 in such a manner as to be able to receive forces in the axial direction of the operating shaft 20 (in the Z axis direction) and forces in the directions along a plane vertical to the axial direction (horizontal plane including the X and Y axes) from the base body 30. In more details, each of the sensors 35 in this example has an engagement section 35a which projects from a sensor main body 35b toward the center of the operating shaft 20. A plurality of holes 30c (holes that penetrate the base body 30 in the radial direction of the operating shaft 20 in this example) are formed in the outer perimeter surface of the base body 30, with each of the engagement sections 35a fitted in one of the holes 30c. This engagement structure ensures that forces in the axial direction of the operating shaft 20 and forces in the direction along the plane vertical to the axial direction, act on the sensors 35. For example, the sensor 35-1 (refer to FIG. 6) receives a force in the Z axis direction and a force in the Y axis direction from the base body 30. It should be noted that each of the sensor main bodies 35b is attached to a member fixed to the housing 2, thereby fixing the position of each of the sensors 35. The base body 30 is supported by the sensor 35 via the engagement section 35a, and the motion of the base body 30 is restricted by the sensor 35.

Each of the sensors 35 includes a strain gauge to detect the force applied by the base body 30. As illustrated in FIG. 6, each of the sensors 35 in this example has two detection directions that intersect each other. A first detection direction D1 of each of the sensors 35 intersects the horizontal plane that includes the X and Y axes (plane vertical to the axial direction of the operating shaft 20 at its initial position). More specifically, the first detection direction D1 of each of the sensors 35 is set to be the Z axis direction. Each of the sensors 35 outputs a positive value, for example, when a force in the positive Z axis direction acts on the engagement section 35a. Each of the sensors 35 outputs a negative value, for example, when a force in the negative Z axis direction acts on the engagement section 35a. A second detection direction D2 of each of the sensors 35 is set to be the horizontal plane. The second detection directions D2 of the plurality of sensors 35 are set to be at least two directions that intersect each other. In this example, the four sensors 35 each have, as the second detection direction D2, a direction tangent to a circle having the Z axis as its center. In the example shown in FIG. 6, the second detection direction D2 of the sensor 35-1 is the positive Y axis direction. The second detection direction D2 of the sensor 35-3 is the negative Y axis direction. The second detection direction D2 of the sensor 35-2 is the negative X axis direction. The second detection direction D2 of the sensor 35-4 is the positive axis direction. Each of the sensors 35 outputs a positive value when a positive force in the second detection direction D2 acts on the engagement section 35a. Each of the sensors 35 outputs a negative value when a negative force in the second detection direction D2 acts on the engagement section 35a.

As illustrated in FIGS. 3 and 4, the assembly 10 has the first and second movable bodies 40A and 40B. The first and second movable bodies 40A and 40B are arranged on the opposite sides of each other with the base body 30 sandwiched therebetween to support the operating shaft 20. The first movable body 40A is arranged between the first operating section 22A at the upper end of the operating shaft 20 and the base body 30. The second movable body 40B is arranged between the second operating section 22B at the lower end of the operating shaft 20 and the base body 30. The first movable body 40A is opposed to the base body 30 in the axial direction of the operating shaft 20 and supported by the base body 30 in the axial direction. That is, the face of the first movable body 40A facing the base body 30 is in contact with the base body 30. The second movable body 40B is opposed to the base body 30 in the axial direction of the operating shaft 20 and supported by the base body 30 in the axial direction. That is, the face of the second movable body 40B facing the base body 30 is in contact with the base body 30. The first and second movable bodies 40A and 40B are pressed against the base body 30 respectively by springs 45A and 45B which will be described later.

The movable bodies 40A and 40B in this example have base members 41A and 41B, respectively. The base members 41A and 41B are arranged on the base body 30. Further, the movable bodies 40A and 40B have tube members 42A and 42B, respectively. The tube members 42A and 42B are arranged respectively on the base members 41A and 41B. The tube members 42A and 42B are located on the side of the end portion of the shaft main body 21 relative to the base members 41A and 41B, respectively. The shaft main body 21 includes the large diameter portion 23 approximately at its center. The large diameter portion 23 has a larger diameter than any other portions of the shaft main body 21. Further, the shaft main body 21 has shaft portions 24A and 24B. The shaft portion 24A extends from the large diameter portion 23 toward the first operating section 22A and is smaller in diameter than the large diameter portion 23. The shaft portion 24B extends from the large diameter portion 23 toward the second operating section 22B and is smaller in diameter than the large diameter portion 23. The base members 41A and 41B are ring-shaped. The tube members 42A and 42B are tubular in shape. The base members 41A and 41B and the tube members 42A and 42B are arranged on a common centerline (i.e., Z axis), with the shaft main body 21 inserted in the base members 41A and 41B and the tube members 42A and 42B. In more details, the shaft portion 24A is inserted in the base member 41A and the tube member 42A, and the shaft portion 24B is inserted in the base member 41B and the tube member 42B. The base members 41A and 41B are arranged on the opposite sides of each other with the large diameter portion 23 sandwiched therebetween. The base members 41A and 41B sandwich the large diameter portion 23 in the axial direction of the operating shaft 20 by the action of the springs 45A and 45B to be described later.

The tube members 42A and 42B hold the shaft portions 24A and 24B, respectively. That is, the tube member 42A has an inner diameter matching the diameter of the shaft portion 24A. The shaft portion 24A is fitted in the tube member 42A. Similarly, the tube member 42B has an inner diameter matching the diameter of the shaft portion 24B. The shaft portion 24B is fitted in the tube member 42B.

The base members 41A and 41B hold the large diameter portion 23. In other words, the upper area of the large diameter portion 23 is fitted in the base member 41A, and the lower area thereof is fitted in the base member 41B. As will be described in detail later, each of the base members 41A and 41B has a plurality of engagement sections (four engagement sections in this example) 41c. The engagement sections 41c are arranged in the circumferential direction of the operating shaft 20 with spacings therebetween. The upper area of the large diameter portion 23 is fitted in the four engagement sections 41c of the base member 41A. The lower area of the large diameter portion 23 is fitted in the four engagement sections 41c of the base member 41B.

As illustrated in FIGS. 3 and 4, the assembly 10 has the springs 45A and 45B. The springs 45A and 45B in this example are coil springs. The spring 45A is arranged in a posture in which the spring 45A is elastically deformed in the axial direction of the operating shaft 20. One end of the spring 45A is supported by the first movable body 40A, and the other end by the operating shaft 20. That is, the tube member 42A has, on the side of the base member 41A, a flange 42f located on the base member 41A, and the other end of the spring 45A is arranged on the flange 42f. The spring 45A is sandwiched between the flange 42f and the first operating section 22A, thus producing an elastic force to counter the approach of the first movable body 40A and the first operating section 22A in the axial direction. The distance between the flange 42f and the first operating section 22A is smaller than the natural length of the spring 45A (length under no load condition). As will be described later, therefore, the initial elastic force of the spring 45A acts on the base body 30. As with the spring 45A, the spring 45B is arranged in a posture in which the spring 45B is elastically deformed in the axial direction of the operating shaft 20. One end of the spring 45B is supported by the second movable body 40B, and the other end by the operating shaft 20. The tube member 42B has, on the side of the base member 41B, a flange 42f located on the base member 41B, and the other end of the spring 45B is arranged on the flange 42f. The spring 45B is sandwiched between the flange 42f of the tube member 42B and the second operating section 22B, thus producing an elastic force to counter the approach of the second movable body 40B and the second operating section 22B in the axial direction. The distance between the flange 42f of the tube member 42B and the second operating section 22B is smaller than the natural length of the spring 45B. Therefore, the initial elastic force of the spring 45B acts on the base body 30.

The shaft portion 24A and the tube member 42A are inserted in the spring 45A, and the shaft portion 24B and the tube member 42B are inserted in the spring 45B. The operating section 22A is located away from the end portion (upper end) of the tube member 42A. This allows the operating shaft 20 to move over that distance in the negative Z axis direction, that is, until the operating section 22A comes into contact with the tube member 42A. Further, the operating section 22B is located away from the end portion (lower end) of the tube member 42B. This allows the operating shaft 20 to move over that distance in the positive Z axis direction, that is, until the operating section 22B comes into contact with the tube member 42B.

Figure 7:
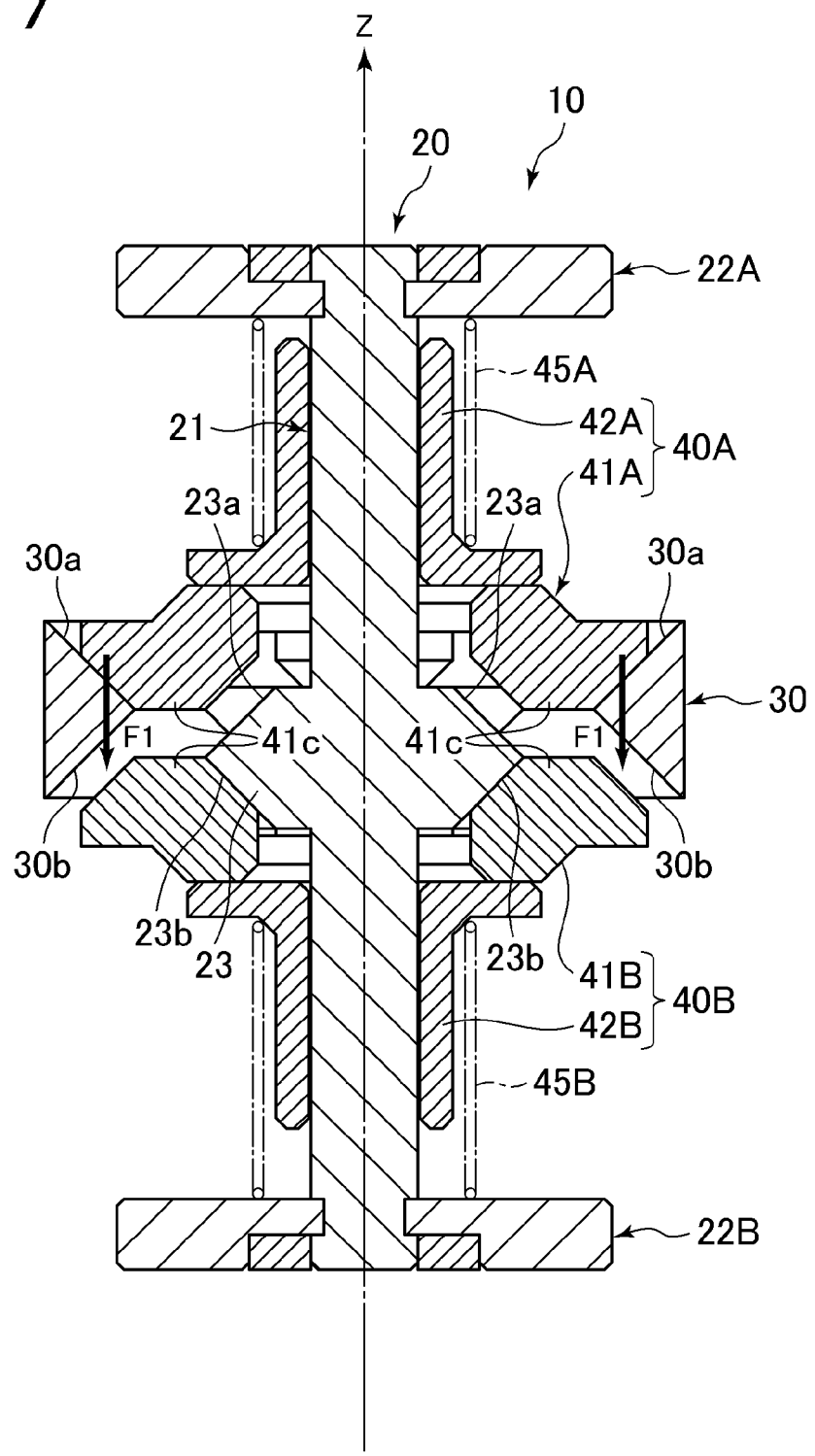
FIG. 7 is a cross-sectional view illustrating the operating shaft when the shaft is moved in the axial direction.
Figure 8:
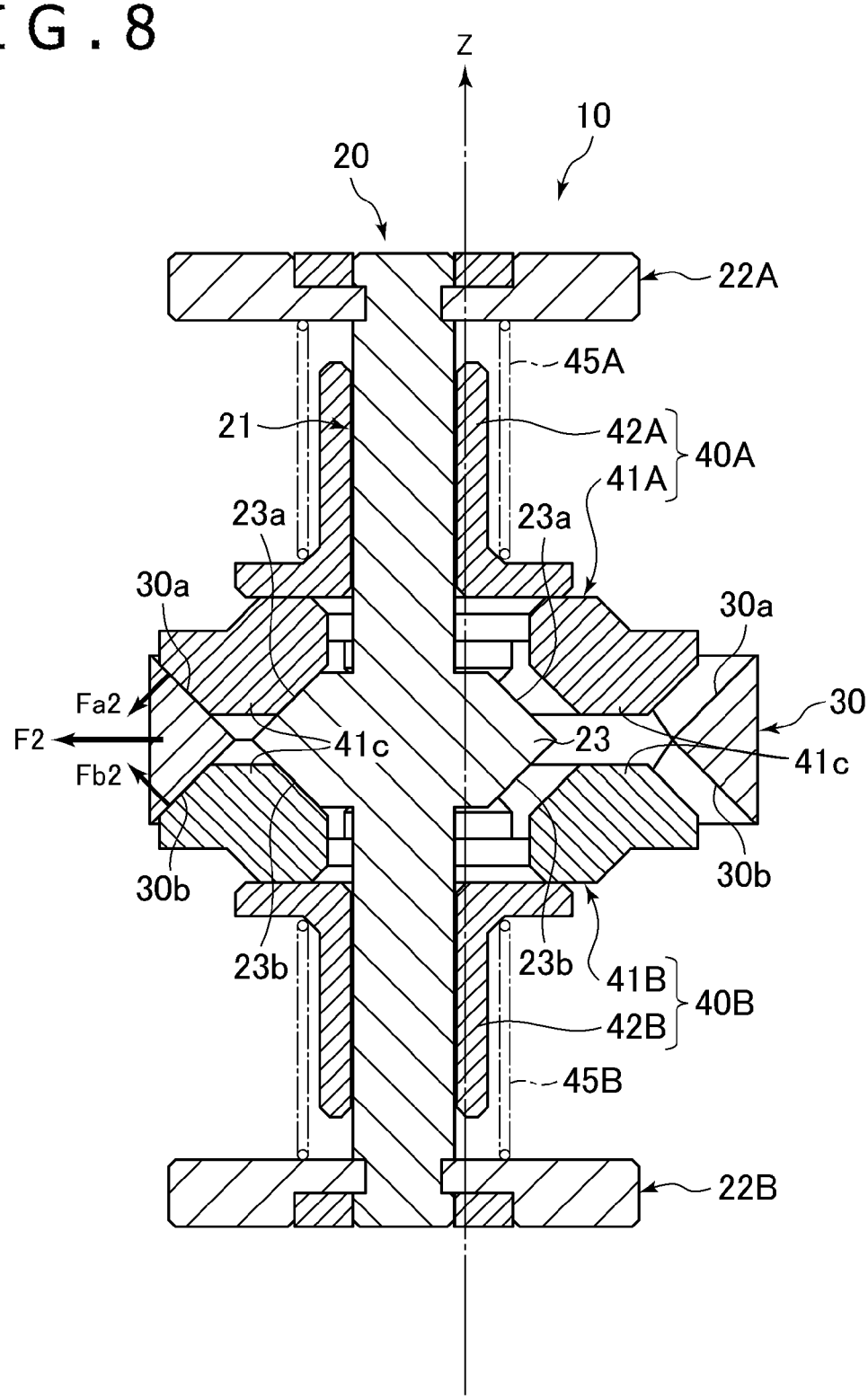
FIG. 8 is a cross-sectional view illustrating the operating shaft when the shaft is translated in the radial direction.
Figure 9:
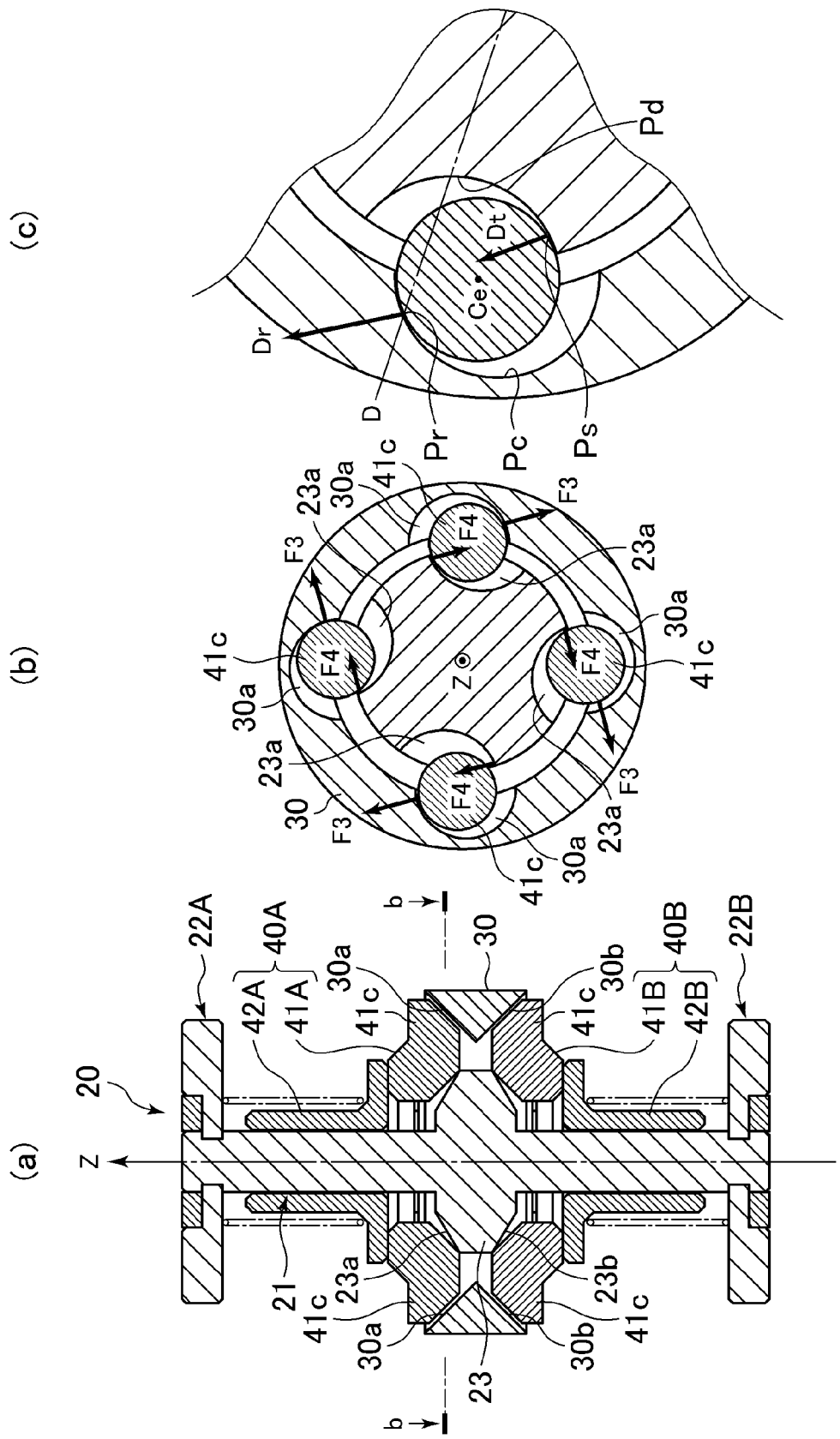
FIG. 9 is a diagram illustrating the operating shaft when the shaft is rotated about its center.
Figure 10:
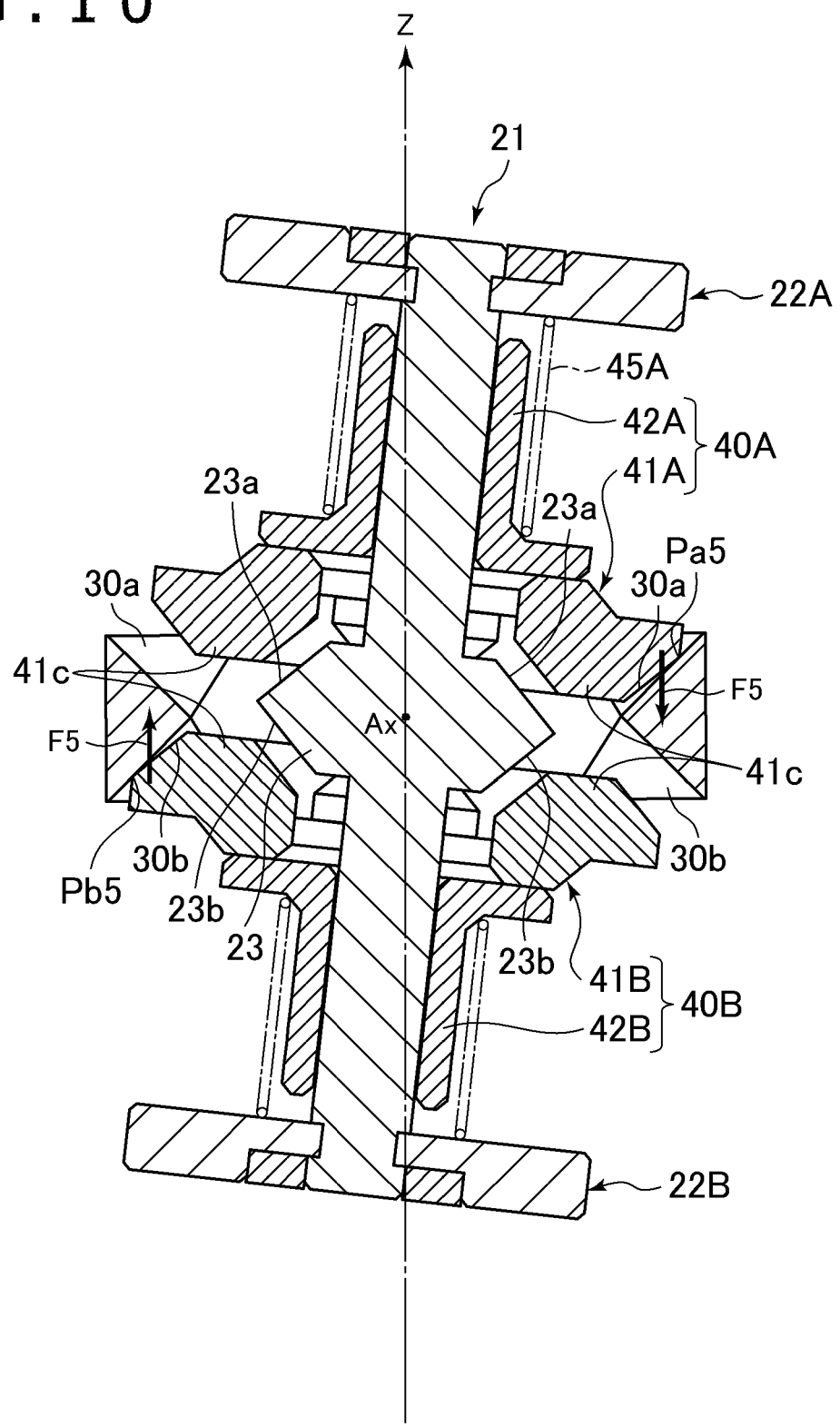
FIG. 10 is a cross-sectional view of the operating shaft when the shaft is tilted.

FIGS. 7 to 10 are diagrams illustrating the operating shaft 20 when the shaft is moved. FIG. 7 is a cross-sectional view illustrating the operating shaft 20 when the shaft is moved in the axial direction. FIG. 8 is a cross-sectional view illustrating the operating shaft 20 when the shaft is translated in the radial direction. FIG. 9 is a diagram illustrating the operating shaft 20 when the shaft is rotated about its center. FIG. 9($a$) is a cross-sectional view. FIG. 9($b$) is a cross-sectional view along line b-b in (a). FIG. 9($c$) is an enlarged view of (b). FIG. 10 is a cross-sectional view of the operating shaft 20 when the shaft is tilted.

As illustrated in these figures, the operating shaft 20 is supported in such a manner as to be able to translate in the axial direction thereof (Z axis direction) (FIG. 7) and tilt (tilt about an arbitrary axis Ax that runs along the radial direction, FIG. 10). Further, the operating shaft 20 is supported in such a manner as to be able to move on a plane vertical to the center of the operating shaft 20. More specifically, the operating shaft 20 moves on a plane vertical to its center in two ways, i.e., translation in the radial direction thereof (FIG. 8) and rotation about the center thereof (Z axis) (FIG. 9). In the description given below, the axial direction of the operating shaft 20 at its initial position will be referred to as the Z axis direction.

The movable bodies 40A and 40B and the base body 30 are formed in such a manner that forces in the direction appropriate to the motion of the operating shaft 20 can be exerted on the base body 30 from the movable bodies 40A and 40B. In the present embodiment, the movable bodies 40A and 40B are supported by the base body 30 in the Z axis direction. As a result, forces in the Z axis direction (F1 (FIG. 7) and F5 (FIG. 10)) can be exerted on the base body 30 from the movable bodies 40A and 40B. Further, the movable bodies 40A and 40B and the base body 30 are formed in such a manner that forces in the direction along a plane vertical to the Z axis direction can be exerted on the base body 30 from the movable bodies 40A and 40B. More specifically, as will be described later, the movable bodies 40A and 40B and the base body 30 are formed in such a manner that a force in the radial direction of the operating shaft 20 (F2 (FIG. 8)) and a rotational force about the operating shaft 20 (resultant force of F3 (FIG. 9)) can be exerted on the base body 30 from the movable bodies 40A and 40B. Forces acting on the base body 30 are detected by the sensors 35.

Further, the movable bodies 40A and 40B can move relative to the operating shaft 20 in the axial direction of the operating shaft 20, i.e., in the direction of elastic deformation of the springs 45A and 45B. The assembly 10 has contact surfaces 30a and 30b. The contact surfaces 30a and 30b move the movable bodies 40A and 40B in the direction of elastic deformation of the springs 45A and 45B in response to the movement of the operating shaft 20 in the radial direction and the rotation of the operating shaft 20 about its center. In this example, the contact surfaces 30a and 30b are formed on the base body 30 (refer to FIGS. 3 and 5). As a result of their contact with the contact surfaces 30a and 30b, the movable bodies 40A and 40B move in the direction of elastic deformation of the springs 45A and 45B, thus elastically deforming the springs 45A and 45B, respectively. The forces resulting from the elastic deformation of the springs 45A and 45B are applied to the base body 30 from the movable bodies 40A and 40B.

A detailed description will be given below of the operating shaft 20, the movable bodies 40A and 40B, and the base body 30.

[Structure Relating to the Motion in the Axial Direction]

As described earlier, the movable bodies 40A and 40B hold the operating shaft 20 in such a manner as to permit relative movement in the axial direction. Therefore, the operating shaft 20 can translate in the Z axis direction as illustrated in FIG. 7. The spring 45A is arranged between the first movable body 40A and the first operating section 22A, and the spring 45B is arranged between the second movable body 40B and the second operating section 22B. Therefore, when the operating shaft 20 moves in its axial direction (Z axis direction), a force appropriate to the amount of travel acts evenly on the four sensors 35.

That is, when the operating shaft 20 moves in the negative Z axis direction as illustrated in FIG. 7, the spring 45A contracts as a result of approach of the first operating section 22A to the first movable body 40A. As a result, the elastic force of the spring 45A appropriate to the amount of travel of the operating shaft 20 is applied to the base body 30 as a whole, thus causing a force F1, a force in the negative Z axis direction, to act evenly on the four sensors 35. Conversely, when the operating shaft 20 moves in the positive Z axis direction, the spring 45B contracts as a result of approach of the second operating section 22B to the second movable body 40B. As a result, a force in the positive Z axis direction acts evenly on the four sensors 35. This makes it possible to calculate the amount of travel of the operating shaft 20 from the forces detected by the sensors 35 in the first detection direction.

As illustrated in FIG. 7, the second movable body 40B is in contact with the operating shaft 20 in the axial direction in such a manner as to move together with the operating shaft 20 when the operating shaft 20 moves in the negative Z axis direction (direction from the first operating section 22A toward the second operating section 22B). More specifically, the second movable body 40B is in contact with the lower area (the area on the side of the second operating section 22B) of the large diameter portion 23 of the operating shaft 20. In this example, a plurality of contact surfaces 23b are formed on the lower area of the large diameter portion 23 as will be described in detail later. The plurality of engagement sections 41c are formed on the second movable body 40B, and the outer perimeter surfaces of the engagement sections 41c are in contact with the contact surfaces 23b. Therefore, when the operating shaft 20 moves in the negative Z axis direction, the elastic force of the spring 45B does not act as a counter force to counter the motion of the operating shaft 20. The spring 45A is installed in such a manner as to produce an initial elastic force in the axial direction of the operating shaft 20. That is, the spring 45A is under an initial load that contracts the spring 45A when the operating shaft 20 is at its initial position. As a result, the movement of the operating shaft 20 in the negative Z axis direction begins when a force exceeding the initial elastic force of the spring 45A is applied to the operating shaft 20. This minimizes the movement of the operating shaft 20 which is not intended by the user, thus providing improved operability of the operating shaft 20.

Similarly, the first movable body 40A is in contact with the operating shaft 20 in the axial direction in such a manner as to move together with the operating shaft 20 when the operating shaft 20 moves in the positive Z axis direction (direction from the second operating section 22B toward the first operating section 22A). More specifically, the first movable body 40A is in contact with the upper area (the area on the side of the first operating section 22A) of the large diameter portion 23 of the operating shaft 20. In this example, a plurality of contact surfaces 23a are formed on the upper area of the large diameter portion 23 as will be described in detail later. The plurality of engagement sections 41c are formed on the first movable body 40A, and the outer perimeter surfaces of the engagement sections 41c are in contact with the contact surfaces 23a. The spring 45B is installed in such a manner as to produce an initial elastic force in the axial direction of the operating shaft 20 and delivers an elastic force that spreads the second movable body 40B and the second operating section 22B away from each other when the operating shaft 20 is at its initial position. As a result, the movement of the operating shaft 20 in the positive Z axis direction begins when a force exceeding the initial elastic force of the spring 45B is applied to the operating shaft 20. It should be noted that the force exerted on the base body 30 by the initial elastic force of the spring 45A and the force exerted on the base body 30 by the initial elastic force of the spring 45B cancel out each other when the operating shaft 20 is at its initial position.

[Structure Relating to the Motion in the Radial Direction]

The base body 30 has surfaces in contact with the movable bodies 40A and 40B to receive radial forces from the movable bodies 40A and 40B. In this example, each of the base members 41A and 41B has a ring-shaped portion 41f and the engagement sections 41c as illustrated in FIGS. 3 and 5. The ring-shaped portion 41f surrounds the operating shaft 20. The engagement sections 41c project from the ring-shaped portion 41f toward the large diameter portion 23 of the operating shaft 20 and the base body 30. The base body 30 has, on the upper area of the inner circumferential portion (area on the side of the first operating section 22A), the contact surfaces 30a in contact with the outer perimeter surfaces of the engagement sections 41c of the base member 41A. Further, the base body 30 has, on the lower area of the inner circumferential portion (area on the side of the second operating section 22B), the contact surfaces 30b in contact with the outer perimeter surfaces of the engagement sections 41c of the base member 41B. The radial force F2 is applied to the base body 30 via the engagement sections 41c and the contact surfaces 30a and 30b (refer to FIG. 8).

As illustrated in FIGS. 3 and 5, the base members 41A and 41B in this example have the plurality of engagement sections 41c that are arranged with spacings therebetween in the circumferential direction of the operating shaft 20. In this example, each of the base members 41A and 41B has the four engagement sections 41c that are arranged at intervals of 90 degrees. On the other hand, the base body 30 has the plurality of contact surfaces (four contact surfaces in this example) 30a and the plurality of contact surfaces (four contact surfaces in this example) 30b. The four contact surfaces 30a are arranged with spacings therebetween in the circumferential direction of the operating shaft 20, thus surrounding, as a whole, the four engagement sections 41c of the base member 41A. Similarly, the four contact surfaces 30b are arranged with spacings therebetween in the circumferential direction of the operating shaft 20, thus surrounding, as a whole, the four engagement sections 41c of the base member 41B. Therefore, the force F2 can act on the base body 30 via the contact surfaces 30a and 30b irrespective of the angle of the radial direction at which the movable bodies 40A and 40B move.

The movable bodies 40A and 40B hold the operating shaft 20. That is, the movable bodies 40A and 40B are fitted on the operating shaft 20. As a result, when the operating shaft 20 moves in the radial direction, the movable bodies 40A and 40B move in the radial direction together with the operating shaft 20. The contact surfaces 30a and 30b are sloped to guide the movement of the movable bodies 40A and 40B in the axial direction of the operating shaft 20 (i.e., the direction of elastic deformation of the springs 45A and 45B).

The engagement sections 41c in this example are formed in such a manner as to become gradually thinner toward their tips, with their outer perimeter surfaces sloped relative to the Z axis direction as illustrated in FIGS. 3 and 5. More specifically, each of the engagement sections 41c is in the shape of a circular truncated cone. The base body 30 has four concave portions in each of its upper and lower areas of the inner circumferential portion. The front faces of the concave portions serve as the contact surfaces 30a and 30b. The concave portions in this example are hollow to match the outer areas of the engagement sections 41c in the radial direction. The contact surfaces 30a and 30b are sloped to match the outer perimeter surfaces of the outer areas of the engagement sections 41c. That is, the contact surfaces 30a are sloped in such a manner as to ascend toward the outside in the radial direction, and the contact surfaces 30b are sloped in such a manner as to descend toward the outside in the radial direction. In other words, where the contact surfaces 30a and 30b are formed, the base body 30 becomes gradually narrower (thinner) toward the center in the Z axis direction.

As illustrated in FIG. 8, therefore, when the operating shaft 20 moves in the radial direction, the first movable body 40A moves in the axial direction of the operating shaft 20 (in the positive Z axis direction) as a result of contact between the engagement sections 41c and the contact surfaces 30a while at the same time moving in the radial direction. On the other hand, the second movable body 40B moves in the axial direction of the operating shaft 20 (in the negative Z axis direction) as a result of contact between the engagement sections 41c and the contact surfaces 30b while at the same time moving in the radial direction. As a result, the springs 45A and 45B are contracted, causing an elastic force appropriate to the amount of travel of the operating shaft 20 to be applied to the movable bodies 40A and 40B. When the elastic forces of the springs 45A and 45B act on the movable bodies 40A and 40B, forces Fa2 and Fb2 vertical to the contact surfaces 30a and 30b are exerted on the base body 30 from the engagement sections 41c. Of these forces, the force component vertical to the Z axis direction acts on the base body 30 as the force F2. The force components in the Z axis direction cancel each other out.

As illustrated in FIGS. 3 and 5, the operating shaft 20 has the contact surfaces 23a and 23b. The contact surfaces 23a and 23b are also formed in such a manner as to move the movable bodies 40A and 40B in the axial direction of the operating shaft 20 (in the direction of elastic deformation of the springs 45A and 45B) in response to the movement of the operating shaft 20 in the radial direction. In more details, the large diameter portion 23 of the operating shaft 20 has concave portions at positions matching those of the engagement sections 41c. That is, the large diameter portion 23 of the operating shaft 20 has four concave portions on each of the upper area (area on the side of the first operating section 22A) and the lower area (area on the side of the second operating section 22B) of the outer perimeter portion. The front faces of the concave portions serve as the contact surfaces 23a and 23b. The concave portions are formed to match the inner areas of the engagement sections 41c in the radial direction (areas on the side of the center of the operating shaft 20). The contact surfaces 23a and 23b are sloped to match the outer perimeter surfaces of the engagement sections 41c. That is, the contact surfaces 23a are sloped in such a manner as to ascend toward the center of the operating shaft 20, and the contact surfaces 23b are sloped in such a manner as to descend toward the center of the operating shaft 20.

As illustrated in FIG. 8, therefore, when the operating shaft 20 translates in the radial direction, the first movable body 40A moves in the axial direction of the operating shaft 20 (in the positive Z axis direction) as a result of contact between the contact surfaces 23a and 30a and the engagement sections 41c while at the same time moving in the radial direction. On the other hand, the second movable body 40B moves in the axial direction of the operating shaft 20 (in the negative Z axis direction) as a result of contact between the contact surfaces 23b and 30b and the engagement sections 41c while at the same time moving in the radial direction. It should be noted that the concave portion formed in the large diameter portion 23 and the concave portion formed in the base body 30 (contact surfaces 30a and 30b) make up a concave portion shaped to match the shape (circular truncated cone) of the single engagement section 41c. When the operating shaft 20 is at its initial position, the engagement sections 41c are fitted in the concave portions formed by these sloped surfaces.

By forming contact surfaces both in the base body 30 and the large diameter portion 23, it is possible to minimize tilting of the movable bodies 40A and 40B relative to the horizontal plane when the operating shaft 20 translates in the radial direction. The circumferential position and width of each of the plurality of contact surfaces 30a and 30b and the plurality of contact surfaces 23a and 23b are set so that the movable bodies 40A and 40B can move in the axial direction irrespective of the angle of the radial direction at which the operating shaft 20 moves.

As described earlier, the springs 45A and 45B deform elastically as the movable bodies 40A and 40B move in the axial direction of the operating shaft 20. Because of the elastic deformation of the springs 45A and 45B, the radial force F2 appropriate to the amount of travel of the operating shaft 20 acts on the base body 30. This force is detected in the second detection direction D2 of the sensors 35 (refer to FIG. 6), thus allowing the amount of travel of the operating shaft 20 to be calculated from the detected force. For example, the amount of travel in the X axis direction can be calculated based on the forces detected by the sensors 35-2 and 35-4 (refer to FIG. 6) in the second detection direction D2. Further, the amount of travel in the Y axis direction can be calculated based on the forces detected by the sensors 35-1 and 35-3 (refer to FIG. 6) in the second detection direction D2.

Because the movable bodies 40A and 40B are used as described above, it is possible to apply two forces, one appropriate to the translation of the operating shaft 20 in the radial direction and another appropriate to the movement of the operating shaft 20 in the axial direction, to the sensors 35 using only the springs 45A and 45B. This contributes to a reduced number of springs. Further, it is possible to adjust the ease with which the operating shaft 20 moves by changing the relative amount of travel of the movable bodies 40A and 40B with respect to the amount of travel of the operating shaft 20. For example, reducing the relative amount of travel of the movable bodies 40A and 40B in the axial direction with respect to the amount of translation of the operating shaft 20 in the radial direction makes it easier for the operating shaft 20 to move in the radial direction.

As described above, each of the springs 45A and 45B is installed in such a manner as to produce an initial elastic force that presses the movable body 40A or 40B against the base body 30. This initial elastic force biases the operating shaft 20 to its initial position. That is, the initial elastic force of the spring 45A causes a force to act on the contact surfaces 23a. This force presses the operating shaft 20 toward the center in the radial direction (center of the operating shaft 20). A force also acts on the contact surfaces 23b to press the operating shaft 20 toward the center in the radial direction. The operating shaft 20 is biased to its initial position as a balance is struck between forces acting on the four contact surfaces 23a and the four contact surfaces 23b. The translation of the operating shaft 20 in the radial direction begins when a force exceeding this force is applied. This minimizes the movement of the operating shaft 20 which is not intended by the user, thus providing improved operability of the operating shaft 20.

[Structure Relating to the Rotation about the Shaft Center]

The base body 30 has surfaces in contact with the movable bodies 40A and 40B to receive forces in the circumferential direction of the operating shaft 20, i.e., a rotational force about the center of the operating shaft 20 (resultant force of the force components F3 in the tangential direction of the circle about the operating shaft 20 (refer to FIG. 9(b))). In this example, the above-described contact surfaces 30a and 30b are formed in such a manner as to receive a rotational force. More specifically, each of the contact surfaces 30a and 30b is curved in such a manner as to surround the outer perimeter surface of the outer area of the engagement section 41c as illustrated in FIG. 5. That is, each of the contact surfaces 30a and 30b is curved about a centerline Ce of the engagement section 41c and therefore has an arc-shaped cross-section (the centerline Ce is the centerline of the engagement section 41c that runs along the axial direction of the operating shaft 20). This shape of the contact surfaces 30a and 30b ensures that the base body 30 receives a rotational force about the center of the operating shaft 20 when the operating shaft 20 rotates.

That is, when the movable bodies 40A and 40B rotate relatively with respect to the base body 30 as illustrated in FIG. 9(c), each of the engagement sections 41c comes into contact with a position Pr that deviates from a center position Pc of the contact surface 30a or 30b (the center position Pc is the center of the contact surface 30a or 30b about the centerline Ce in the circumferential direction). Because the contact surfaces 30a and 30b are curved, a direction Dr in which the engagement section 41c comes into contact with the position Pr is inclined toward the direction of rotation of the operating shaft 20 with respect to a radial direction D of the operating shaft 20. Therefore, the force component F3 in the tangential direction of the circle about the operating shaft 20 can be exerted on the contact surface 30a from the engagement section 41c. The force components F3, each acting on one of the plurality of contact surfaces 30a, cause a rotational force about the center of the operating shaft 20 to act on the base body 30. The plurality of contact surfaces 30a are formed in the base body 30 equidistantly in the circumferential direction of the operating shaft 20. Therefore, the force components F3, each acting on one of the plurality of contact surfaces 30a, cancel each other out in the X and Y axis directions.

The contact surfaces 30a and 30b are formed in such a manner as to move the movable bodies 40A and 40B in the axial direction of the operating shaft 20 (i.e., direction of elastic deformation of the springs 45A and 45B) in response to the motion of the operating shaft 20 in the circumferential direction of the operating shaft 20, i.e., the rotation of the operating shaft 20 about the center of the operating shaft 20. That is, the engagement sections 41c in contact with the contact surfaces 30a and 30b become gradually thinner toward their tips as described earlier, with the outer perimeter surfaces of the engagement sections 41c sloped relative to the centerline Ce. The contact surfaces 30a and 30b are sloped to match the outer perimeter surfaces of the engagement sections 41c. Therefore, each of the contact surfaces 30a ascends from an inner edge 30f thereof toward an outer edge 30g thereof as illustrated in FIG. 5. Similarly, each of the contact surfaces 30b descends from its inner edge toward its outer edge. These shapes of the contact surfaces 30a and 30b ensure that the movable bodies 40A and 40B move in the axial direction of the operating shaft 20 when rotating relatively with respect to the base body 30. That is, the movable body 40A moves in the direction of elastic deformation of the spring 45A as a result of contact between the engagement sections 41c of the base member 41A and the contact surfaces 30a. Similarly, the movable body 40B moves in the direction of elastic deformation of the spring 45B as a result of contact between the engagement sections 41c of the base member 41B and the contact surfaces 30b.

When the springs 45A and 45B are contracted by the movable bodies 40A and 40B that move in the axial direction of the operating shaft 20, the force components F3 appropriate to the elastic forces of the springs 45A and 45B act evenly on the contact surfaces 30a and 30b. As a result, a rotational force acts on the base body 30. This rotational force acts on each of the sensors 35 in the second detection direction D2 (refer to FIG. 6). The amount of rotation of the operating shaft 20 can be calculated from the forces detected by the sensors 35.

The engagement sections 41c of the base members 41A and 41B and the large diameter portion 23 of the operating shaft 20 are in contact with each other so that the movable bodies 40A and 40B rotate together with the operating shaft 20. In more details, the large diameter portion 23 of the operating shaft 20 has concave portions at positions matching those of the engagement sections 41c as described earlier. As illustrated in FIG. 5, the contact surfaces 23a and 23b, the front faces of the concave portions, are curved in such a manner as to surround the inner areas of the outer perimeter surfaces of the engagement sections 41c (areas on the side of the operating shaft 20). That is, each of the contact surfaces 23a and 23b is curved about the centerline Ce of the engagement section 41c. As a result, the rotational force acting on the operating shaft 20 is applied to the movable bodies 40A and 40B via the contact surfaces 23a and 23b.

That is, when the operating shaft 20 attempts to rotate, the contact surfaces 23a and 23b relatively move in the direction of rotation of the operating shaft 20 relative to the engagement sections 41c as illustrated in FIG. 9(c). As a result, each of the engagement sections 41c comes into contact with a position Ps that deviates from a center position Pd of the contact surface 23a or 23b (here, the center position Pd is the center of the contact surface 23a or 23b about the centerline Ce in the circumferential direction). Because the contact surfaces 23a and 23b are curved, a direction Dt in which the contact surface 23a or 23b comes into contact with the engagement section 41c is inclined toward the direction of rotation of the operating shaft 20 with respect to the radial direction of the operating shaft 20. Therefore, a force component F4 in the tangential direction of the circle about the operating shaft 20 (refer to FIG. 9(b)) can be exerted on the engagement section 41c from the contact surface 23a or 23b. Then, the force components F4, each acting on one of the four engagement sections 41c, cause a rotational force about the center of the operating shaft 20 to act on the movable bodies 40A and 40B. This allows the movable bodies 40A and 40B to rotate together with the operating shaft 20. The four engagement sections 41c are formed on each of the movable bodies 40A and 40B equidistantly in the circumferential direction of the operating shaft 20. Therefore, the force components F4, each acting on one of the plurality of engagement sections 41c, cancel each other out in the X and Y axis directions.

The contact surfaces 23a and 23b are formed in such a manner as to move the movable bodies 40A and 40B in the axial direction of the operating shaft 20 (i.e., direction of elastic deformation of the springs 45A and 45B) in response to the rotation of the operating shaft 20 about the center of the operating shaft 20. That is, the engagement sections 41c in contact with the contact surfaces 23a and 23b become gradually thinner toward their tips, with the outer perimeter surfaces of the engagement sections 41c sloped relative to the centerline Ce as illustrated in FIG. 5. The contact surfaces 23a and 23b are sloped to match the outer perimeter surfaces of the engagement sections 41c. Therefore, each of the contact surfaces 23a ascends gradually from an outer edge 23f thereof toward an inner edge 23g thereof. Similarly, each of the contact surfaces 23b descends gradually from its outer edge toward its inner edge. The sloping of the contact surfaces 23a and 23b and the above-described contact surfaces 30a and 30b ensures that the movable bodies 40A and 40B move in the axial direction of the operating shaft 20 as the operating shaft 20 rotates.

It should be noted that a force adapted to bias the operating shaft 20 to its initial position is exerted on the operating shaft 20 by the initial elastic forces of the springs 45A and 45B. Therefore, the rotation of the operating shaft 20 about the center of the operating shaft 20 also begins when a force exceeding the force adapted to bias the operating shaft 20 to its initial position is applied.

[Structure Relating to Tilt]

The movable bodies 40A and 40B hold the operating shaft 20 in such a manner as to permit relative movement in the axial direction. The movable bodies 40A and 40B can move in opposite directions from the base body 30. That is, the first movable body 40A can move in the axial direction of the operating shaft 20 toward the first operating section 22A. The second movable body 40B can move in the axial direction of the operating shaft 20 toward the second operating section 22B. This structure allows the movable bodies 40A and 40B to tilt relative to the base body 30, i.e., the horizontal plane including the X and Y axes, as illustrated in FIG. 10. As a result, the operating shaft 20 can rotate (tilt) about an axis Ax that runs along the radial direction at an arbitrary angle.

As illustrated in FIG. 10, when the operating shaft 20 tilts about the axis Ax, the movable bodies 40A and 40B come into contact with the base body 30 at opposite positions with the axis Ax sandwiched therebetween. Then, the movable bodies 40A and 40B apply, to the base body 30, forces in the Z axis direction that point in opposite directions at these contact points. In more details, when the operating shaft 20 tilts, the first movable body 40A has a contact point Pa5 with the base body 30 on the side to which the first operating section 22A moves (right side in the example shown in FIG. 10), causing the first movable body 40A to tilt about the contact point Pa5. This reduces the distance between the first movable body 40A and the first operating section 22A, causing the spring 45A to deform elastically (contract). Then, the force F5 in the negative Z axis direction resulting from the elastic deformation of the spring 45A acts on the base body 30 via the contact point Pa5. Further, when the operating shaft 20 tilts, the second movable body 40B has a contact point Pb5 on the side to which the second operating section 22B moves (left side in the example shown in FIG. 10), i.e., the side opposite to the contact point Pa5 with the axis Ax sandwiched therebetween. The second movable body 40B tilts about the contact point Pb5. This reduces the distance between the second movable body 40B and the second operating section 22B, causing the spring 45B to deform elastically. The force F5 in the positive Z axis direction resulting from the elastic deformation of the spring 45B acts on the base body 30 via the contact point Pb5. In other words, a moment about the axis Ax acts on the base body 30.

It should be noted that the contact points Pa5 and Pb5 are in contact with the contact surfaces 30a and 30b of the base body 30, respectively. Therefore, the force F5 in the negative Z axis direction and a force in the radial direction act on each of the contact surfaces 30a, and the force F5 in the positive Z axis direction and a force in the radial direction act on each of the contact surfaces 30b. The forces in the radial direction acting on the contact surfaces 30a and 30b cancel each other out.

The sensors 35 detect the forces F5 in the first detection direction D1 (refer to FIG. 6). The amount of tilt (amount of rotation) of the operating shaft 20 can be calculated from the forces detected by the sensors 35. That is, the amounts of rotation about the X and Y axes can be calculated. For example, the amount of rotation about the X axis can be calculated based on the forces detected by the sensors 35-2 and 35-4 in the first detection direction D1. The amount of rotation about the Y axis can be calculated based on the forces detected by the sensors 35-1 and 35-3 in the first detection direction D1.

It should be noted that the force adapted to bias the operating shaft 20 to its initial position is exerted on the operating shaft 20 by the initial elastic forces of the springs 45A and 45B as described earlier. Therefore, the tilting of the operating shaft 20 also begins when a force exceeding the force adapted to bias the operating shaft 20 to its initial position is applied.

As described above, the operating device 1 includes the operating shaft 20, the movable bodies 40A and 40B adapted to support the operating shaft 20, and the base body 30. The base body 30 supports the movable bodies 40A and 40B in the axial direction of the operating shaft 20 in such a manner as to permit the movable bodies 40A and 40B to move on a plane vertical to the axial direction of the operating shaft 20. Further, the base body 30 includes areas (contact surfaces 30a and 30b in the above description) in contact with the movable bodies to receive forces in the directions running along a plane vertical to the axial direction from the movable bodies 40A and 40B. Further, the operating device 1 includes the plurality of sensors 35 adapted to detect forces acting on the base body 30. The operating device 1 can detect the motion of the operating shaft on a plane vertical to the axial direction of the operating shaft 20. Further, the operating shaft 20 is held by the movable bodies 40A and 40B, and the movable bodies 40A and 40B are supported by the base body 30 in such a manner as to be able to move on a plane vertical to the axial direction. This makes it easier to provide a range of motion of the operating shaft 20 than the structure in which the base body 30 and the operating shaft 20 are directly connected by an elastic body such as rubber.

The sensors 35 detect forces in the axial direction of the operating shaft 20 that act on the base body 30. This makes it possible to detect the motion of the operating shaft 20 in the axial direction of the operating shaft 20.

The contact surfaces 30a and 30b of the base body 30 are formed in such a manner that a force in the radial direction of the operating shaft 20 acts on the contact surfaces 30a and 30b as a force along a plane vertical to the axial direction of the operating shaft 20. This makes it possible to detect the motion of the operating shaft 20 in the radial direction.

The contact surfaces 30a and 30b of the base body 30 are formed in such a manner that a rotational force about the operating shaft 20 acts on the contact surfaces 30a and 30b as a force along a plane vertical to the axial direction of the operating shaft 20. This makes it possible to detect the rotation of the operating shaft 20 about its center.

Further, the operating device 1 includes the springs 45A and 45B adapted to apply elastic forces appropriate to the amount of travel of the operating shaft 20 to the movable bodies 40A and 40B. This makes it possible to detect the amount of travel of the operating shaft 20.

The movable bodies 40A and 40B hold the operating shaft 20 in such a manner as to permit relative movement in the axial direction. The springs 45A and 45B can elastically deform in the axial direction of the operating shaft 20. One end of each of the springs 45A and 45B is supported by one of the movable bodies 40A and 40B. The other end thereof is supported by the operating shaft 20. This makes it possible to detect the amount of travel of the operating shaft 20 in the axial direction.

The contact surfaces 30a and 30b of the base body 30 are in contact with the movable bodies 40A and 40B respectively in such a manner as to displace the movable bodies 40A and 40B in the direction of elastic deformation of the springs 45A and 45B in response to the motion of the operating shaft 20 on a plane vertical to the axial direction of the operating shaft 20. This makes it possible to detect the amount of travel of the operating shaft 20 on a plane vertical to the axial direction of the operating shaft 20 thanks to the springs 45A and 45B.

The operating shaft 20 includes the first and second operating sections 22A and 22B. The first operating section 22A is provided at one end of the operating shaft 20. The second operating section 22B is provided at the other end of the operating shaft 20 and is located on the opposite side of the first operating section 22A with the base body 30 sandwiched therebetween. Further, the operating device 1 has the first and second movable bodies 40A and 40B. The first movable body 40A is arranged on the base body 30 on the side of the first operating section 22A. The second movable body 40B is arranged on the base body 30 on the side of the second operating section 22B. This makes it possible to further increase the number of ways in which the operating shaft 20 can be operated.

The movable bodies 40A and 40B can move in the axial direction relative to the operating shaft 20. The operating device 1 has the springs 45A and 45B. The spring 45A is arranged between the first movable body 40A and the first operating section 22A to deliver an initial elastic force in the axial direction of the operating shaft 20 when the operating shaft 20 is at its initial position. The spring 45B is arranged between the second movable body 40B and the second operating section 22B to deliver an initial elastic force in the axial direction of the operating shaft 20 when the operating shaft 20 is at its initial position. The first movable body 40A is in contact with the operating shaft 20 to move together with the operating shaft 20 when the operating shaft 20 moves in a direction from the second operating section 22B toward the first operating section 22A. The second movable body 40B is in contact with the operating shaft 20 to move together with the operating shaft 20 when the operating shaft 20 moves in a direction from the first operating section 22A toward the second operating section 22B. This minimizes the movement of the operating shaft 20 which is not intended by the user, thus providing improved operability of the operating shaft 20.

Further, the springs 45A and 45B can elastically deform in the axial direction of the operating shaft 20. The springs 45A and 45B are elastically deformed by the movable bodies 40A and 40B that move in the axial direction of the operating shaft 20. The contact surfaces 30a and 30b are in contact with the movable bodies 40A and 40B in such a manner as to permit movement of the movable bodies 40A and 40B in the axial direction in response to the movement of the operating shaft 20 in the radial direction and the rotation of the operating shaft 20 about its center. The sensors 35 detect forces appropriate to the elastic forces of the springs 45A and 45B. This eliminates the need to arrange springs in such a manner as to elastically deform in the radial or rotational direction of the operating shaft 20, thus providing a higher degree of freedom in layout of the springs.

The movable bodies 40A and 40B are arranged on the base body 30. The spring 45A is arranged between the first movable body 40A and the first operating section 22A. The spring 45B is arranged between the second movable body 40B and the second operating section 22B. The base body 30 has the contact surfaces 30a and 30b. The sensors 35 detect elastic forces exerted on the base body 30 via the contact surfaces 30a and 30b. This makes it possible to simplify the structure as compared to the formation of the contact surfaces 30a and 30b at positions other than on the base body 30.

The operating shaft 20 has the first and second operating sections 22A and 22B. The first operating section 22A is provided at one end of the operating shaft 20. The second operating section 22B is provided at the other end of the operating shaft 20 and is located on the opposite side of the first operating section 22A with the base body 30 sandwiched therebetween. Further, the operating device 1 has the first movable body 40A, the spring 45A, the second movable body 40B, and the spring 45B. The first movable body 40A is arranged on the base body 30 on the side of the first operating section 22A. The spring 45A is arranged between the first movable body 40A and the first operating section 22A. The second movable body 40B is arranged on the base body 30 on the side of the second operating section 22B. The spring 45B is arranged between the second movable body 40B and the second operating section 22B. This makes it possible to increase the number of ways in which the operating device 1 can be operated.

It should be noted that the present invention is not limited to the operating device 1 described above but may be modified in various ways.

For example, only the first operating section 22A may be provided on the operating shaft 20. The second operating section 22B need not always be provided.

The operating shaft 20 can translate in the axial direction, translate in the radial direction, tilt, and rotate about its center. However, the operating shaft 20 need not always be permitted to perform all these motions. For example, the operating shaft 20 need not always be able to rotate about its center. In this case, a single ring-shaped engagement section adapted to surround the operating shaft 20 rather than the plurality of engagement sections 41c may be provided on each of the base members 41A and 41B of the movable bodies 40A and 40B. Then, contact surfaces may be formed on the base body 30. These contact surfaces are in contact with the outer perimeter surfaces of the ring-shaped engagement sections. This allows the movable bodies 40A and 40B to move in the axial direction of the operating shaft 20 (direction of elastic deformation of the springs 45A and 45B) when the operating shaft 20 moves in the radial direction.

Further, the number of the sensors 35 is not limited to four. The three or five sensors 35 may be arranged in the circumferential direction of the operating shaft 20.

In the operating device 1, on the other hand, the springs 45A and 45B can be deformed compressively in the axial direction of the operating shaft 20. The contact surfaces 30a and 30b of the base body 30 move the movable bodies 40A and 40B in the axial direction of the operating shaft 20 in response to translation of the operating shaft 20 in the radial direction. However, the movable bodies 40A and 40B, the springs 45A and 45B, and the base body 30 may be configured in the following manner. That is, the movable bodies 40A and 40B may be able to rotate in the circumferential direction about the operating shaft 20 relative to the operating shaft 20. Then, the springs 45A and 45B may be made of torsion springs that can be torsionally deformed in the circumferential direction about the operating shaft 20 and are twisted by the rotating movable bodies 40A and 40B. Further, the base body 30 may have contact sections. The contact sections are in contact with the outer perimeter surfaces of the movable bodies 40A and 40B in such a manner as to permit the rotation of the movable bodies 40A and 40B in response to the movement of the operating shaft 20 in the radial direction. Still further, the movable bodies 40A and 40B may be in contact with the base body 30 in the rotational direction of the movable bodies 40A and 40B in such a manner that torsional elastic forces of the springs 45A and 45B resulting from the rotation of the movable bodies 40A and 40B are exerted on the base body 30 from the movable bodies 40A and 40B. This structure also eliminates the need for springs that elastically deform in the radial direction of the operating shaft 20, thus providing elastic forces appropriate to the amount of travel of the operating shaft 20 in the radial direction.

The invention claimed is:

1. An operating device comprising:
   an operating shaft having a central axis, which at rest is co-axial with a reference axis;
   a movable body adapted to hold the operating shaft;
   a base body that is opposed to the movable body in the axial direction of the operating shaft, the base body including a portion that is in contact with the movable body, supports the movable body in such a manner as to permit the operating shaft to move on a plane vertical to the operating shaft such that the operating shaft is movable axially along the reference axis, radially away from the reference axis, and rotationally about the central axis, and receives forces that vary in magnitude in directions along the plane vertical to the operating shaft resulting from the motion of the operating shaft; and
   sensors adapted to detect the forces that vary in magnitude acting on the base body such that: (i) a first range of forces are detectable when the operating shaft is moved axially along the reference axis; (ii) a second range of forces are detectable when the operating shaft is moved radially away from the reference axis; (iii) a third range of forces are detectable when the operating shaft is moved rotationally about the central axis.

2. The operating device of claim 1, wherein the sensors further detect forces in the axial direction of the operating shaft acting on the base body.

3. The operating device of claim 1, wherein the forces in the directions along the plane vertical to the axial direction of the operating shaft are forces in the radial direction of the operating shaft.

4. The operating device of claim 1, wherein the forces in the directions along the plane vertical to the axial direction of the operating shaft are forces in the circumferential direction about the operating shaft.

5. The operating device of claim 1, further comprising an elastic body adapted to apply an elastic force appropriate to the amount of travel of the operating shaft to the movable body.

6. The operating device of claim 5, wherein
the movable body holds the operating shaft in such a manner as to permit relative movement in the axial direction, and
the elastic body can be deformed elastically in the axial direction of the operating shaft, and one end of the elastic body is supported by the movable body, and the other end of the elastic body is supported by the operating shaft.

7. The operating device of claim 6, wherein the base body is in contact with the movable body in such a manner as to displace the movable body in the direction of elastic deformation of the elastic body in response to the motion of the operating shaft on the plane vertical to the axial direction of the operating shaft.

8. The operating device of claim 1, comprising:
a first operating section provided at one end of the operating shaft;
a second operating section provided at the other end of the operating shaft and located on the opposite side of the first operating section with the base body sandwiched therebetween;
a first movable body arranged on the base body on the side of the first operating section to serve as the movable body; and
a second movable body arranged on the base body on the side of the second operating section to serve as the movable body.

9. The operating device of claim 8, wherein
the sensors further detect forces in the axial direction of the operating shaft acting on the base body,
the first and second movable bodies can relatively move in the axial direction relative to the operating shaft,
the operating device has first and second elastic bodies, the first elastic body being arranged between the first movable body and the first operating section and installed in such a manner as to deliver an initial elastic force in the axial direction of the operating shaft when the operating shaft is at its initial position, and the second elastic body being arranged between the second movable body and the second operating section and installed in such a manner as to deliver an initial elastic force in the axial direction of the operating shaft when the operating shaft is at its initial position,
the first movable body is in contact with the operating shaft in such a manner as to move together with the operating shaft when the operating shaft moves from the second operating section toward the first operating section, and
the second movable body is in contact with the operating shaft in such a manner as to move together with the operating shaft when the operating shaft moves from the first operating section toward the second operating section.

10. The operating device of claim 1, further comprising:
an elastic body that produces an elastic force in response to being elastically deformed by the movable body moving in a first direction; and
a contact section of the base body that is in contact with the movable body to allow the movable body to move in the first direction in response to the motion of the operating shaft in a second direction;
wherein the sensors are adapted to detect the first range of forces that are proportional to the elastic force of the elastic body.

11. The operating device of claim 10, wherein
the movable body is arranged on the base body,
the elastic body is arranged on the movable body, and
the sensors detect the elastic force received by the base body via the contact section.

12. The operating device of claim 10, wherein the second direction is a radial direction of the operating shaft moving radially away from the reference axis.

13. The operating device of claim 10, wherein the second direction is a circumferential direction of the operating shaft moving rotationally about the central axis.

14. The operating device of claim 11, comprising:
a first operating section provided at one end of the operating shaft;
a second operating section provided at an opposite end of the operating shaft and located on an opposite side of the first operating section with the base body sandwiched therebetween;
the movable body including a first movable body arranged on the base body on a side of the first operating section;
the elastic body including a first elastic body arranged between the first movable body and the first operating section;
the movable body including a second movable body arranged on the base body on a side of the second operating section; and
the elastic body including a second elastic body arranged between the second movable body and the second operating section.

15. An operating device comprising:
an operating shaft;
a movable body adapted to hold the operating shaft; and
a base body that is opposed to the movable body in the axial direction of the operating shaft, the base body including a portion that is in contact with the movable body, supports the movable body in such a manner as to permit the operating shaft to move on a plane vertical to the operating shaft, and receives forces in directions along the plane vertical to the operating shaft resulting from the motion of the operating shaft;
sensors adapted to detect the forces acting on the base body; and
an elastic body adapted to apply an elastic force appropriate to the amount of travel of the operating shaft to the movable body, wherein:
the movable body holds the operating shaft in such a manner as to permit relative movement in the axial direction, and
the elastic body can be deformed elastically in the axial direction of the operating shaft, and one end of the elastic body is supported by the movable body, and the other end of the elastic body is supported by the operating shaft.

16. The operating device of claim 6, wherein the base body is in contact with the movable body in such a manner as to displace the movable body in the direction of elastic deformation of the elastic body in response to the motion of the operating shaft on the plane vertical to the axial direction of the operating shaft.

17. An operating device comprising:
an operating shaft;
a movable body adapted to hold the operating shaft; and
a base body that is opposed to the movable body in the axial direction of the operating shaft, the base body including a portion that is in contact with the movable body, supports the movable body in such a manner as to permit the operating shaft to move on a plane vertical to the operating shaft, and receives forces in directions along the plane vertical to the operating shaft resulting from the motion of the operating shaft;

sensors adapted to detect the forces acting on the base body;

a first operating section provided at one end of the operating shaft;

a second operating section provided at the other end of the operating shaft and located on the opposite side of the first operating section with the base body sandwiched therebetween;

a first movable body arranged on the base body on the side of the first operating section to serve as the movable body; and a second movable body arranged on the base body on the side of the second operating section to serve as the movable body.

18. The operating device of claim 17, wherein the sensors further detect forces in the axial direction of the operating shaft acting on the base body, the first and second movable bodies can relatively move in the axial direction relative to the operating shaft, the operating device has first and second elastic bodies, the first elastic body being arranged between the first movable body and the first operating section and installed in such a manner as to deliver an initial elastic force in the axial direction of the operating shaft when the operating shaft is at its initial position, and the second elastic body being arranged between the second movable body and the second operating section and installed in such a manner as to deliver an initial elastic force in the axial direction of the operating shaft when the operating shaft is at its initial position, the first movable body is in contact with the operating shaft in such a manner as to move together with the operating shaft when the operating shaft moves from the second operating section toward the first operating section, and the second movable body is in contact with the operating shaft in such a manner as to move together with the operating shaft when the operating shaft moves from the first operating section toward the second operating section.

* * * * *